(12) United States Patent
Sarconi

(10) Patent No.: US 6,638,072 B1
(45) Date of Patent: Oct. 28, 2003

(54) PHRASE-COMPOSING DEVICE FEATURING INTERLOCKING COLLARS

(76) Inventor: Matthew Steven Sarconi, 204 Anderson St., San Francisco, CA (US) 94110

( * ) Notice: Subject to any disclaimer, the term of this patent is extended or adjusted under 35 U.S.C. 154(b) by 0 days.

(21) Appl. No.: 10/290,680

(22) Filed: Nov. 8, 2002

(51) Int. Cl.[7] .................................................. G09B 1/18
(52) U.S. Cl. ................................. 434/174; 273/153 S
(58) Field of Search ................................ 434/167, 159, 434/172, 174; 273/153 S, 157 R

(56) References Cited

U.S. PATENT DOCUMENTS

| | | | |
|---|---|---|---|
| 463,230 A | 11/1891 | Hooly | |
| 2,411,717 A | 11/1946 | Fay et al. | |
| 2,476,580 A | 7/1949 | Bergman | |
| 2,608,006 A | 8/1952 | Mulvihill | |
| 3,407,514 A | 10/1968 | Christian | |
| 3,603,593 A | 9/1971 | Chew | |
| 3,674,905 A | * 7/1972 | Collins, Sr. | 35/35 G |
| 3,717,942 A | * 2/1973 | Presby | 35/77 |
| 3,873,096 A | 3/1975 | Shoptaugh | |
| 3,970,315 A | 7/1976 | Redner | |
| 4,146,978 A | 4/1979 | Breslow | |
| 4,295,832 A | * 10/1981 | Karell | 434/168 |
| 4,651,992 A | 3/1987 | Danino et al. | |
| 4,714,429 A | 12/1987 | Phillips | |
| 4,779,870 A | 10/1988 | Nichols | |
| 4,865,324 A | * 9/1989 | Nesis | 273/155 |
| 4,902,230 A | 2/1990 | Jones | |
| 4,949,969 A | 8/1990 | Johnson | |
| 5,007,840 A | 4/1991 | Gaskell | |
| 5,074,561 A | 12/1991 | Johnson | |
| 5,150,900 A | 9/1992 | Onzo | |
| 5,516,289 A | 5/1996 | Quigley et al. | |
| 6,142,784 A | 11/2000 | Wood | |
| 6,460,849 B1 | 10/2002 | Bean | |

* cited by examiner

*Primary Examiner*—Jacob K. Ackun
*Assistant Examiner*—Jamila Williams
(74) *Attorney, Agent, or Firm*—Mark J. Spolyar

(57) ABSTRACT

An amusement or educational device comprising a plurality of interlocking collars slidable along and rotatable about a common shaft, and bearing elements of a multi-element relationship about their circumferences. In one embodiment, the collars are configured to allow users to construct fortunes, words, sentences, equations, or other relationships by selectively interlocking adjacent collars to align word, mathematical, sentence or other appropriate elements disposed around the collars. In one embodiment, the present invention provides a fortune-telling or entertainment device allowing users to compose fortunes or other relationships by selectively combining multi-word sentence fragments disposed around the circumference of interlocking collars.

24 Claims, 3 Drawing Sheets

| Collar 1 | Collar 2 | Collar 3 | Collar 4 |
|---|---|---|---|
| Trust your gut | and live for today. | The time is near to | see the big picture. |
| Regain control | and embrace change. | Wait another day to | head for the hills. |
| Open your eyes | and consider plan B. | Be prepared to | throw a hissy fit. |
| Speak your mind | and thank your stars. | Do not attempt to | reward yourself. |
| Drop your guard | and don't look back. | Seize the chance to | ask for help. |
| Follow your heart | and bend the rules. | The time is right to | start anew. |
| Test a theory | and face a fear. | It's not too late to | spread some gossip. |
| Lead by example | and share a secret. | It is best not to | burn a bridge. |
| Call an old friend | and shake things up. | Now is the time to | forgive someone. |
| Know your limits | and switch parties. | Wait until Friday to | pursue a dream. |
| Question authority | and seek adventure. | Fight the urge to | seek a higher power. |
| Think for yourself | and lie a teeny bit. | The time will pass to | share the wealth. |
| Plan your escape | and say you're sorry. | It is not yet time to | take the low road. |
| Use your strengths | and relive the past. | Do not hesitate to | blame someone else. |
| Get off the fence | and be direct. | It might be best to | take a big leap. |

Fig. 3

PHRASE-COMPOSING DEVICE FEATURING INTERLOCKING COLLARS

FIELD OF THE INVENTION

The present invention relates to amusement or educational devices allowing users to build various relationships by selecting from a set of predefined elements and, more particularly, to a hand-held, phrase-composing device allowing users to construct fortunes, words, sentences, mathematical equations, or other relationships by selectively interlocking adjacent collars to align word, mathematical, sentence or other appropriate elements disposed around the collars.

BACKGROUND OF THE INVENTION

Educational and amusement devices including rotatable elements that allow users to construct words, sentences, mathematical equations and other relationships are known. For example, U.S. Pat. No. 2,411,717 issued to Fay et al teaches an educational device comprising a plurality of adjacent, straight-edged rings disposed around a cylinder. Each ring includes letters disposed around its circumference. A user can adjust the rings relative to one another to spell words. In addition, U.S. Pat. No. 2,476,850 issued to Bergman describes an educational device comprising rotatable elements, each including elements of mathematical equations, to facilitate learning of basic arithmetic operations. U.S. Pat. No. 2,608,006 issued to Mulvihill discloses an educational toy comprising a cylinder and a rotatable cap disposed around the end of the cylinder. The cylinder and the cap have juxtaposed letters or numbers which may be aligned to form words or numbers. Similarly, U.S. Pat. No. 4,146,978 issued to Breslow teaches an amusement device facilitating spelling education comprising rotatable, letter-bearing elements disposed around a common shaft. U.S. Pat. No. 4,651,992 issued to Danino et al. provides a puzzle-type game comprising a plurality of shapes rotatably attached to one another in a series, wherein each shape includes indicia representing elements of a multi-element relationship. To solve the puzzle, the user rotates the shapes relative to one another until all indicia, when aligned, express a valid multi-element relationship.

Fortune telling games and devices are also known. Many prior art fortune telling devices rely on the user to ask a specific question, to roll dice, and/or to draw a card from a stack. For example, prior art fortune telling devices include the well-known eight-ball including a multi-faceted die visible through an opening in the eight-ball. The die includes small fortunes on each face of the die that appear after the user shakes the device. The fortunes that result are usually limited to a small handful of short responses that are often quite vague and require the user to interpret or apply the message to his or her situation. The interaction required to elicit the fortune leaves little room for imagination or variety, or much sense of interactive input and self-determination. In addition, U.S. Pat. No. 3,970,315 issued to Redner teaches a fortune telling game comprising a game board including written intelligence and indexing cards that determine the resulting fortunes that users may interpret.

While the amusement and educational devices discussed above fulfill their respective objectives, the prior art does not disclose or suggest a phrase-composing device including interlocking collars that allow users to construct fortunes, words, sentences, equations, or other relationships by selectively interlocking adjacent collars in various possible positions to align word, equation, or sentence elements disposed around the collars. In addition, the prior art does not disclose or suggest a fortune-composing device that allows users to compose fortunes by selectively combining multi-word sentence fragments disposed around the circumference of interlocking collars.

SUMMARY OF THE INVENTION

The present invention provides an amusement or educational device comprising a plurality of interlocking collars slidable along and rotatable about a common shaft, and bearing elements of a multi-element relationship about their circumferences. In one embodiment, the collars are configured to allow users to construct fortunes, words, sentences, equations, or other relationships by selectively interlocking adjacent collars to align word, mathematical, sentence or other appropriate elements disposed around the collars. In one embodiment, the present invention provides a fortune-telling or entertainment device allowing users to compose fortunes or other relationships by selectively combining multi-word sentence fragments disposed around the circumference of interlocking collars.

DESCRIPTION OF THE DRAWINGS

FIG. 3 is a table setting forth sentence fragments disposed around the circumference of the interlocking collars according to an embodiment of the present invention.

DESCRIPTION OF PREFERRED EMBODIMENT(S)

Figure 1A:
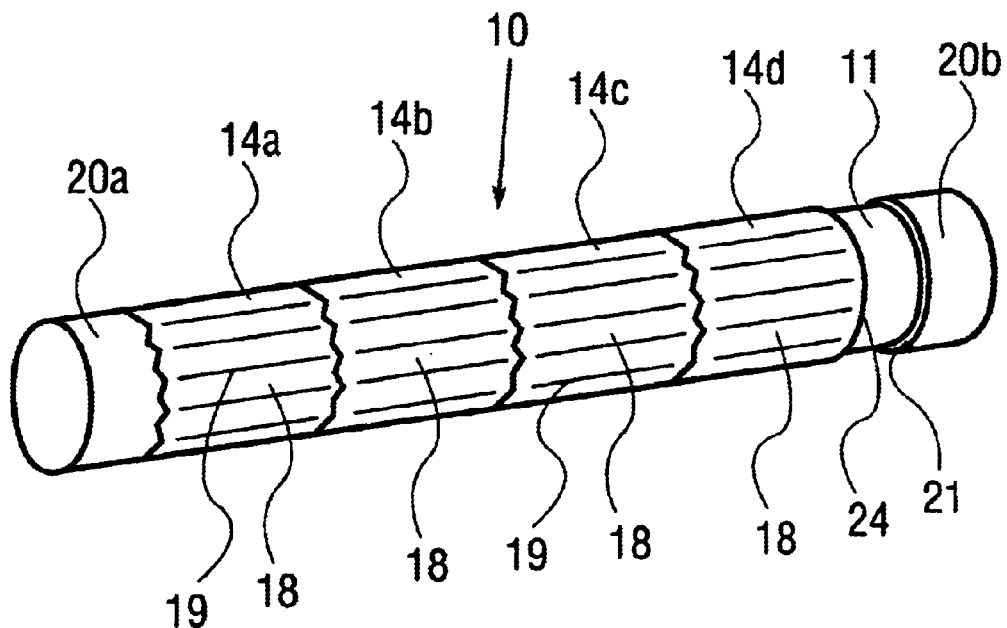
FIG. 1A provides a perspective view of the phrase-composing device, according to an embodiment of the present invention, wherein the collars are interlocked in a fixed orientation.
Figure 1B:
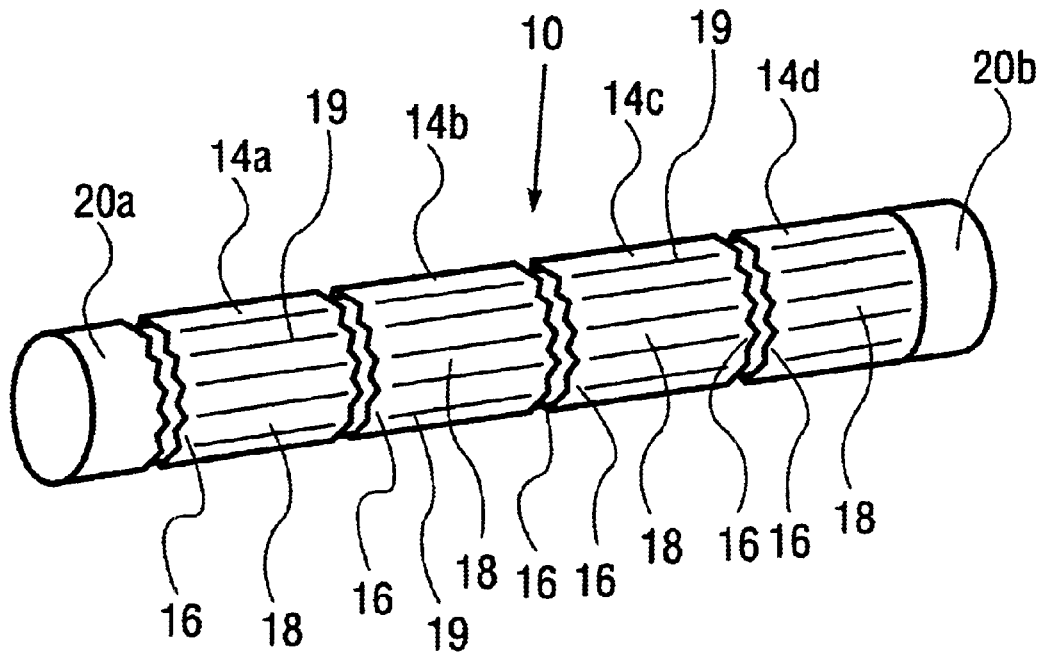
FIG. 1B is a perspective view of the phrase-composing device, according to an embodiment of the present invention, showing the collars in an independently rotatable orientation.
Figure 2:
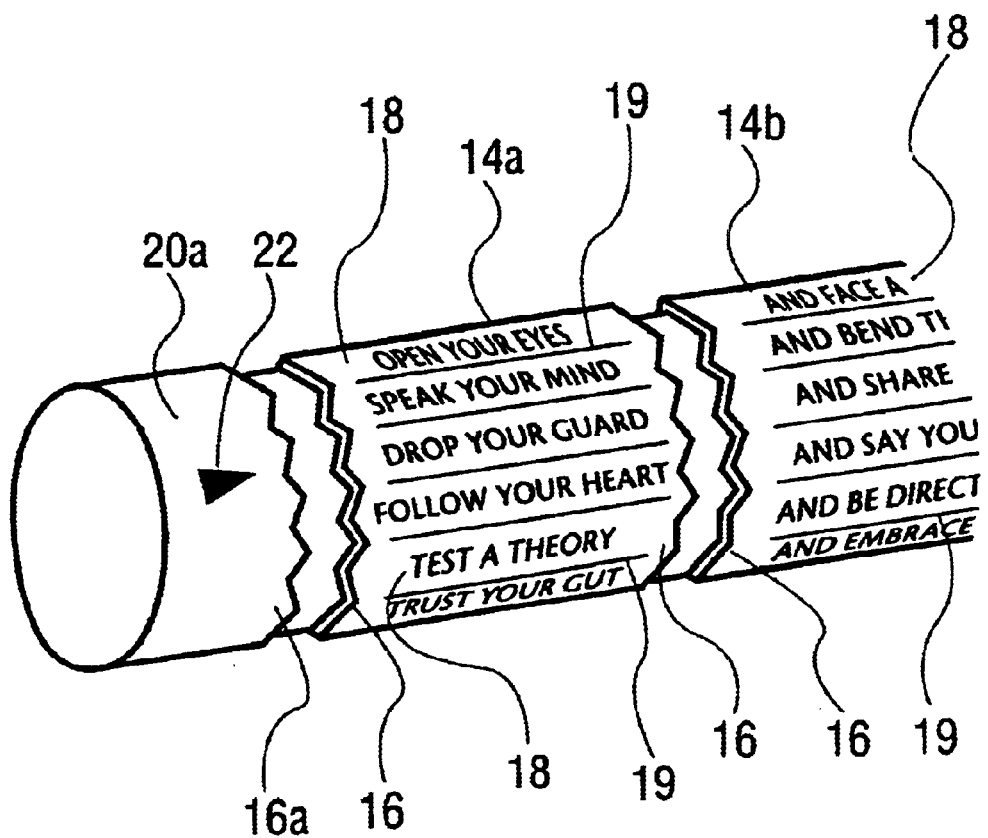
FIG. 2 is an enlarged sectional perspective view of the phrase composing device according to an embodiment of the present invention.

FIGS. 1A and 1B set forth a phrase-composing device according to an embodiment of the present invention. As FIG. 1A illustrates, the phrase-composing device 10 comprises a shaft 11 and a plurality of interlocking collars 14a, 14b, 14c and 14d slidably disposed around the shaft 11. In one embodiment, phrase-composing device 10 further includes first end cap 20a and second end cap 20b that together retain the interlocking collars 14a, 14b, 14c and 14d on the shaft 11. As FIG. 2 illustrates, the first end cap 20a includes a plurality of teeth 16a extending from the inner edge of the first end cap 20a. The first end cap 20a, in one embodiment, further includes read mark 22. As FIG. 1A shows, the second end cap 20b, in one embodiment, is disposed over the opposite end of the shaft 11 and includes a straight or smooth edge 21.

As the Figures illustrate, the interlocking collars 14a, 14b, and 14c have interlocking edges, in one embodiment, comprising a plurality of teeth 16 extending from opposite edges, while the right-most collar 14d includes one set of teeth opposing the teeth extending from the right edge of collar 14c. In one embodiment, the opposite edge 24 of collar 14d has a straight profile featuring no teeth to allow collar 14d to be positioned against the second end cap 20b and nevertheless rotate as desired. In addition, each interlocking collar 14a, 14b, 14c and 14d includes text areas 18 containing, in one embodiment, sentence fragments. The distance between the inner edge of the first end cap 20a and the second end cap 20b is configured to allow users to slide the interlocking collars along the shaft 11 and independently rotate each collar relative to the shaft 11. Specifically, as FIG. 2 shows, the distance between the first end cap 20a and the second end cap 20b allows the user, for example, to slide collars 14b, 14c and 14d to the right against the second end cap 20b to isolate the first collar 14a for independent rotation relative to the first end cap 20a and the remaining collars 14b, 14c and 14d. When the user selects an element disposed on the first collar 14a, he slides the collar 14a against the inner edge of the first end cap 20a to interlock the teeth 16a of the first end cap 20a and the opposing teeth 16 extending from the left edge of the collar 14a to align the selected element with the read mark 22.

FIG. 3 is a table setting forth the sentence fragments located within the text areas 18 disposed around the circumference of the interlocking collars 14a, 14b, 14c and 14d according to an embodiment of the present invention. The sentence fragments, in one embodiment, are designed to be mixed and matched, and, in various combinations across the interlocking collars, form cohesive statements or fortunes. As FIG. 3 illustrates, the interlocking collars 14a, 14b, 14c and 14d, in one embodiment, each have fifteen (15) different multi-word sentence fragments disposed around their respective circumferences, creating 50,625 possible phrase or sentence combinations. In addition, the table provided by FIG. 3 illustrates only one of many possible combinations of sentence fragments. The sentence fragments set forth in FIG. 3 provide an illustrative embodiment rendering the phrase-composing device 10 suitable for use as a fortunetelling or other entertainment device. One of ordinary skill in the art will recognize that an unlimited variety of sentence fragments can be incorporated into embodiments of the present invention to achieve myriad objectives. In constructing a relationship among the elements disposed about the interlocking collars 14a, 14b, 14c and 14d, the user may actively select each element to construct a desired relationship such as a sentence or fortune. Alternatively, the user may elect to randomly select or manipulate the collars to create fortunes or other relationships, as opposed to specifically selecting and aligning elements across the collars to create relationships.

The text areas 18 located on the interlocking collars 14a, 14b, 14c and 14d can include a variety of different elements. As the Figures illustrate, in one embodiment, each text area 18 can include a sentence fragment, which in combination with other sentence fragments on adjacent collars, form sentences, fortunes or other relationships. The text areas 18, however, can be configured to include any suitable element of a multi-element relationship (e.g., letters, numbers, symbols, sentence fragments, clauses, graphics, illustrations, etc.) that, in combination with other elements on adjacent collars, form a relationship (e.g., a word, sentence, fortune, equation, etc.). Of course, one skilled in the art will recognize that the interlocking collars of the present invention can be configured to include fewer or more text areas 18. In one embodiment, lines 19 demarcate text areas 18. In another embodiment, text areas are demarcated or indicated by differently colored regions. In one embodiment, text areas 18 are blank (demarcated by lines 19 or other suitable indicia) allowing the user to apply sentence fragments or other elements in the text areas as the user desires to create a custom phrase-composing device.

As the various Figures illustrate, the teeth 16 extending from the interlocking collars 14a, 14b, 14c and 14d are arranged in a saw-tooth configuration and, individually are triangular in profile. In this arrangement, the number of teeth extending from each of the interlocking collars 14a, 14b, 14c and 14d corresponds to the number of text areas 18 on each collar. As one skilled in the art will recognize, however, the opposing edges of adjacent collars may comprise any suitable shape that allows the collars to interlock to align the text areas 18 in the desired number of positions. For example, the profile of the individual teeth may be semi-circular creating collars having sinusoidal edges. The teeth may also be square or rectangular in profile as well. One skilled in the art will recognize that the profile of the edges of the interlocking collars 14a, 14b, 14c and 14d may be configured to include any suitable interlocking shape.

In use, the user holds the phrase-composing device 10 in his or her left hand substantially at the first end cap 20a. With the right hand, the user slides collars 14a, 14b, 14c and 14d such that the first collar 14a is in an independently rotatable state between the first end cap 20a and the second collar 14b. In this state, the user may rotate the first collar 14a about the shaft 11 and, when a desired element on the collar 14a is located, slide the first collar 14a such that the teeth 16 of the first collar 14a and the teeth 16a of the first end cap 20a interlock. As FIG. 2 illustrates, the first end cap 20a, in one embodiment, includes a read mark 22 indicating the read position and therefore the selected element of the first collar 14a. Similarly, the user then slides or otherwise manipulates the remaining collars 14b, 14c and 14d, such that the second collar 14b is independently rotatable relative to at least the first collar 14a. In this state, the user may then rotate the second collar 14b in either direction about the shaft 11. Once a desired element on the second collar is located, the user then slides the second collar 14b against the first collar 14a such that their respective teeth interlock and align the selected elements of the first and second collars 14a, 14b. The user then repeats this process for the remaining collars 14c and 14d. When the last collar 14d is slid against the third collar 14c, the teeth of the first end cap 20a and the interlocking collars 14a, 14b, 14c and 14d cooperate to prevent the collars and hence the selected elements from becoming misaligned.

As one skilled in the art will recognize, the present invention is capable of being implemented in a variety of different forms. For example, the shaft 11, the first and second end caps 20a and 20b, and the interlocking collars 14a, 14b, 14c and 14d can be made of any suitable material including, but not limited to, cardboard, plastic, metal, wood, and the like. In addition, either or both of first and second end caps 20a and 20b can be permanently fixed to the shaft 11 or removably attached to the shaft 11 to permit the interlocking collars 14a, 14b, 14c and 14d to be exchanged with other collars having different elements. Moreover, the first end cap 20a, for example, may be extended in length and may itself include text areas to be aligned with the text areas of the interlocking collars 14a, 14b, 14c, and 14d.

Furthermore, the shaft 11 may take a variety of forms. For example, the shaft 11 can be hollow or solid. As the various Figures show, the shaft 11, in one embodiment, is cylindrical in overall shape having a circular cross-section. In other embodiments, however, the shaft 11 can be configured to have different cross-sectional shapes, such as an ellipse, a square or rectangle with rounded corners, etc. In such embodiments where the cross-section is non-circular, however, the interlocking collars should comprise a flexible material, such as vinyl or other plastic, to permit the interlocking collars to flex as they rotate about the shaft 11.

Still further, although the embodiments described above are adapted to include sentence fragments disposed around the circumference of the interlocking collars, the text areas 18 of the collars can be configured to include a variety of other elements (such as letters, numbers, mathematical operators, symbols, illustrations, graphics, and the like) to allow the phrase-composing device of the present invention to be used to construct other relationships, such as mathematical equations and words.

Lastly, although the present invention has been described with reference to specific embodiments, various other embodiments are possible without departing from the scope of the present invention. Other embodiments of the present invention will be apparent to one of ordinary skill in the art. It is, therefore, intended that the claims set forth below not be limited to the embodiments described above.

What is claimed is:

1. An apparatus adaptable for use as a phrase-composing device, comprising
    a shaft,
    a first collar slidable along and rotatable about the shaft, wherein the first collar includes teeth extending from a first edge thereof, wherein the first collar has at least two text areas disposed around the circumference thereof,
    a second collar adjacent to the first collar and slidable along and rotatable about the shaft, wherein the second collar includes teeth extending from a first edge thereof and configured to selectively interlock with the teeth extending from the first collar, wherein the second collar has at least two text areas disposed around the circumference thereof,
    wherein the text areas and the teeth of the first and second collars are configured such that at least one text area of the first collar and at least one text area of the second collar are in substantial alignment when the teeth of the first collar and teeth of the second collar interlock.

2. The apparatus of claim 1 wherein the shaft is hollow.

3. The apparatus of claim 1 wherein the cross-sectional shape of the shaft is circular.

4. The apparatus of claim 1 wherein the cross-sectional shape of the shaft is elliptical.

5. The apparatus of claim 4 wherein the first and second collars are made of a flexible material.

6. The apparatus of claim 1 wherein the teeth extending from the first and second collars are arranged in a saw-tooth configuration.

7. The apparatus of claim 1 wherein the teeth are triangular in profile.

8. The apparatus of claim 1 wherein the text areas on the first and second collars are blank.

9. The apparatus of claim 1 wherein the text areas each include a sentence fragment.

10. The apparatus of claim 1 wherein the text areas are demarcated by lines.

11. The apparatus of claim 8 wherein the text areas are demarcated by lines.

12. An apparatus adaptable for use as a phrase composing device, comprising
    a shaft,
    a first end cap attached to a first end of the shaft, wherein the first end cap includes first teeth extending from the inner edge thereof,
    a first collar adjacent to the first end cap and slidable along and rotatable about the shaft, wherein the first collar includes second teeth extending from a first edge thereof and configured to selectively interlock with the first teeth extending from the first end cap, wherein the first collar includes third teeth extending from a second edge thereof, wherein the first collar has at least two text areas disposed around the circumference thereof,
    a second collar adjacent to the first collar and slidable along and rotatable about the shaft, wherein the second collar includes fourth teeth extending from a first edge thereof and configured to selectively interlock with the third teeth extending from the first collar, wherein the second collar has at least two text areas disposed around the circumference thereof,
    wherein the text areas and the teeth of the first and second collars are configured such that at least one text area of the first collar and at least one text area of the second collar are in substantial alignment when the third teeth of the first collar and fourth teeth of the second collar interlock.

13. The apparatus of claim 12 wherein the first end cap further includes a read mark disposed thereon; and wherein the text areas of the first collar and the teeth of the first end cap and the first collar are configured such that a text area on the first collar is in substantial alignment with the read mark when the first teeth of the first end cap and the second teeth of the first collar interlock.

14. The apparatus of claim 12 further comprising a second end cap, wherein the first and second end caps confine the collars on the shaft.

15. The apparatus of claim 14 wherein the distance between the inner edges of the first and second caps permit sliding of the first and second collars and independent movement thereof.

16. The apparatus of claim 12 further comprising at least a third collar slidable along and rotatable about the shaft, wherein the at least a third collar has at least two text areas disposed around the circumference thereof, wherein the at least a third collar includes teeth extending from a first edge thereof and configured to selectively interlock with an adjacent collar such that at least one text area on the at least a third collar is aligned with a text area on an adjacent collar.

17. An apparatus adaptable for use as a phrase-composing device, comprising
    a shaft,
    a first collar slidable along and rotatable about the shaft, wherein the first collar includes teeth extending from a first edge thereof, wherein the first collar has at least two text areas disposed around the circumference thereof,
    a second collar adjacent to the first collar and slidable along and rotatable about the shaft, wherein the second collar includes teeth extending from a first edge thereof and configured to selectively interlock with the teeth extending from the first collar, wherein the second collar has at least two text areas disposed around the circumference thereof,
    wherein each text area disposed on the collars includes a sentence fragment,
    wherein the text areas and the teeth of the first and second collars are configured such that at least one text area of the first collar and at least one text area of the second collar are in substantial alignment when the teeth of the first collar and teeth of the second collar interlock.

18. The apparatus of claim 17 wherein the second collar includes teeth extending from a second edge thereof, the apparatus further comprising
    a third collar adjacent to the second collar and slidable along and rotatable about the shaft, wherein the third collar includes teeth extending from a first edge thereof and configured to selectively interlock with the teeth extending from the second edge of the second collar, wherein the third collar has at least two text areas disposed around the circumference thereof, and wherein the text areas and the teeth of the second and third collars are configured such that at least one text area of the second collar and at least one text area of the third collar are in substantial alignment when the teeth of the second collar and teeth of the third collar interlock.

19. The apparatus of claim 18 wherein the third collar includes teeth extending from a second edge thereof, the apparatus further comprising a fourth collar adjacent to the third collar and slidable along and rotatable about the shaft, wherein the fourth collar includes teeth extending from a first edge thereof and configured to selectively interlock with the teeth extending from the second edge of the third collar, wherein the fourth collar has at least two text areas disposed around the circumference thereof, and wherein the text areas and the teeth of the third and fourth collars are configured such that at least one text area of the third collar and at least one text area of the fourth collar are in substantial alignment when the teeth of the third collar and teeth of the fourth collar interlock.

20. The apparatus of claim 19 further comprising first and second end caps located at first and second ends of the shaft and configured to retain the first, second, third and fourth collars on the shaft.

21. The apparatus of claim 20 wherein the distance between the inner edges of the first and second end caps are configured to allow the first, second, third and fourth collars to slide along the shaft and selectively permit independent rotation of the first, second, third and fourth collars about the shaft.

22. An apparatus adaptable for use as a phrase-composing device, comprising a shaft, at least two collars slidable along and rotatable about the shaft, wherein the at least two collars each have at least two text areas disposed around the circumference thereof, and wherein the at least two collars have selectively interlocking edges configured such that at least one text area of the first collar and at least one text area of the second collar are in substantial alignment when the interlocking edges of adjacent ones of the at least two collars engage.

23. The apparatus of claim 22 wherein the interlocking edges comprise a plurality of teeth.

24. The apparatus of claim 23 wherein the plurality of teeth are arranged in a saw-tooth configuration.

* * * * *